United States Patent [19]

Tsuno

[11] Patent Number: 5,880,240

[45] Date of Patent: *Mar. 9, 1999

[54] ALKYL-CONTAINING POROUS RESIN, PROCESS FOR ITS PREPARATION AND ITS USE

[75] Inventor: Takaharu Tsuno, Tsukuba, Japan

[73] Assignee: Arakawa Chemical Industries, Ltd., Japan

[ * ] Notice: The term of this patent shall not extend beyond the expiration date of Pat. No. 5,731,395.

[21] Appl. No.: 952,926

[22] PCT Filed: Mar. 27, 1997

[86] PCT No.: PCT/JP97/01049

§ 371 Date: Nov. 26, 1997

§ 102(e) Date: Nov. 26, 1997

[87] PCT Pub. No.: WO97/36950

PCT Pub. Date: Oct. 9, 1997

[30] Foreign Application Priority Data

Apr. 3, 1996 [JP] Japan .................................. 8-108490

[51] Int. Cl.[6] ........................ C08F 212/36; C08F 212/12; C08F 2/18
[52] U.S. Cl. ......................... 526/334; 526/206; 526/207; 526/210; 526/212; 526/219.6; 526/292.9; 526/336; 521/147
[58] Field of Search ..................... 526/334, 206, 526/207, 210, 212, 219.6, 292.9, 336; 521/147

[56] References Cited

U.S. PATENT DOCUMENTS 5,731,395  3/1998  Tsuno ................................. 526/334

FOREIGN PATENT DOCUMENTS 59-34532   2/1984  Japan ................................. 526/334
61-254607  11/1986  Japan ................................. 526/334

*Primary Examiner*—Bernard Lipman
*Assistant Examiner*—N. Sarofim
*Attorney, Agent, or Firm*—Armstrong, Westerman, Hattori, McLeland & Naughton

[57] ABSTRACT

An alkyl-containing porous resin with a specific surface area of 50 to 600 $m^2/g$, the resin being prepared by polymerizing a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula

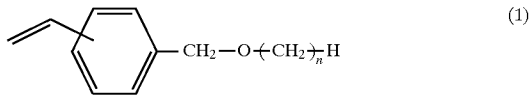

(1)

wherein n is an integer of 1 to 18, a process for its preparation and its use.

The porous resin of the invention is capable of fully exhibit its modified functions based on the variations of chemical and structural environments on the surface of resin, the functions being modified by introducing alkyl groups having varying chain lengths.

8 Claims, 1 Drawing Sheet

F I G. 1
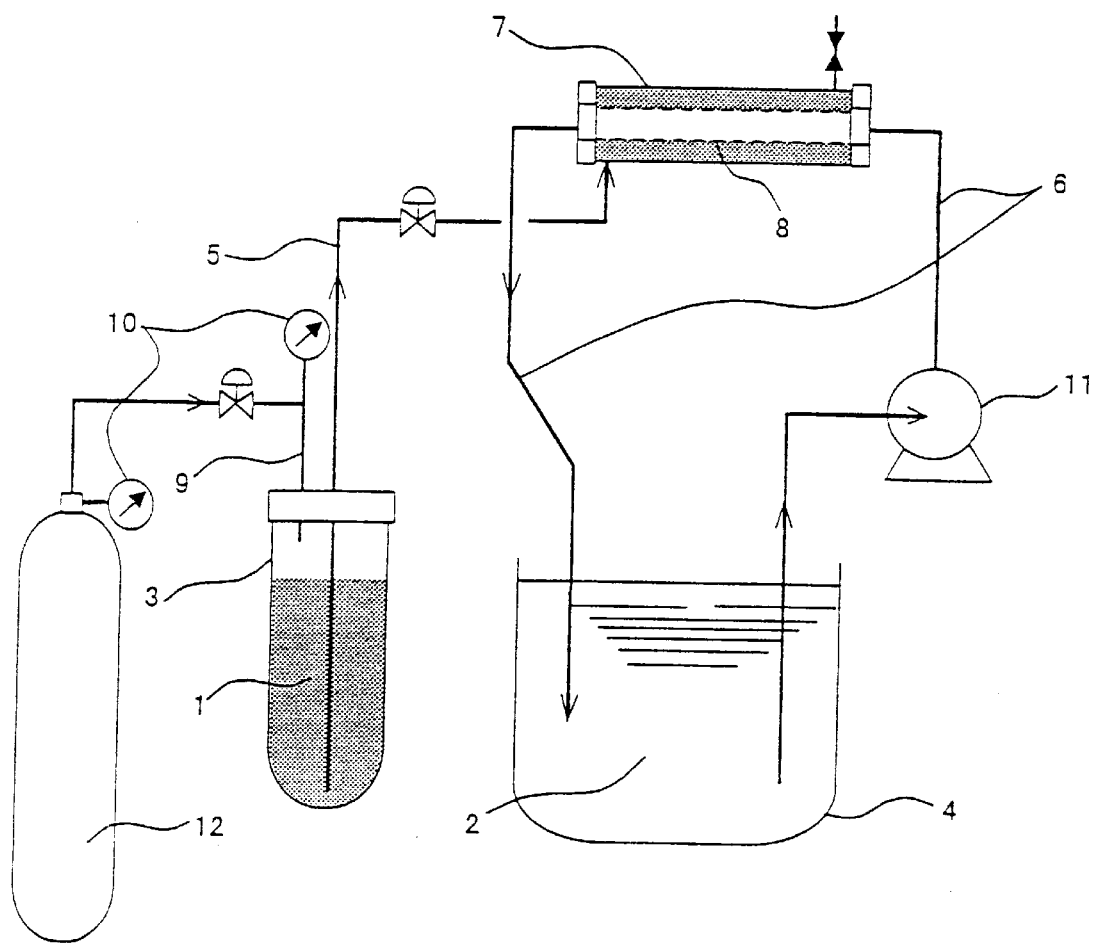

ALKYL-CONTAINING POROUS RESIN, PROCESS FOR ITS PREPARATION AND ITS USE

FIELD OF THE INVENTION

The present invention relates to a novel alkyl-containing porous resin, a process for its preparation and its use.

BACKGROUND ART

Porous materials, because of their useful structural and chemical properties, have been heretofore researched, developed and used in various fields for various applications as packings for analytical or preparative columns, carriers for enzymes or catalysts, supports for adsorbing valuable substances such as medicines, and so on. Typical examples are inorganic materials such as porous silica gel and alumina, and synthetic polymer materials such as divinylbenzene-styrene porous resins and divinylbenzene-methacrylate porous resins.

Silica gel, which has high mechanical strengths, is widely used. It is used by itself mainly as a column packing for normal phase systems, and silica gel to which a long-chain alkyl group is introduced by utilizing a silanol group on its surface is used mainly as a column packing for reversed-phase systems. However, silica gel has problems associated with its inherent chemical stability level, namely a low stability in a basic medium, the influence of residual silanol group or the influence of metals in trace amounts [cf., e.g., J. Chromatogr. Sci., vol.22, p.386 (1984) and J. Chromatogr. vol.149, p.199 (1978)].

Divinylbenzene-styrene porous resins are excellent both in mechanical strengths and chemical stabilities, and has been researched and developed in the field of and for the application as column packings [cf., e.g., J. Chromatogr. Sci, vol.22, p.386 (1984) and J. Chromatogr., vol.442, p.97 (1988)]. Various kinds of the resins are commercially available as polymer-type column packings for reversed-phase systems. Basic processes for preparing divinylbenzene-styrene porous resins have been long known. For example, according to a known process, a monomer mixture comprising divinylbenzene, styrene, etc. is mixed with an organic solvent, and the obtained solution is subjected to a suspension polymerization in water using a radical polymerization initiator. The organic solvent is what is called a porogen which does not participate in the polymerization, is sparingly soluble in water, is capable of solving the monomer mixture but is incapable of solving the resulting copolymer [cf., e.g. J. Appl. Polym. Sci., vol.23, p.927 (1979) and Angew. Makromol. Chem., vol.80, p.31 (1979)]. Generally, this type of porous resin prepared by a suspension polymerization is of the order of $\mu$m to mm in the diameter of apparent particles (hereinafter referred to as "secondary particles"). The secondary particles, when externally or internally observed under an electron microscope, are seen to be firm aggregates of finer particles having a size of the order of nm (hereinafter referred to as "primary particles"). Stated more specifically, the interstices between aggregated primary particles are hollows which have been occupied by the organic solvent during the polymerization. The primary particles, which are highly crosslinked resin particles, are insoluble in most of organic solvents and are substantially free from swelling. The porous resins prepared by this process have a large specific surface area, high mechanical strength and high chemical stability, and therefore are widely used as supports in many fields, column packings for analytical or preparative purposes, etc.

However, a column packed with the divinylbenzene-styrene porous resin generally has considerably inferior performance to a column packed with silica gel. In particular, divinylbenzene-styrene porous resins are poor in the chemical or structural variations on their surfaces (such as control of hydrophobic or hydrophilic properties, control of stereostructures, etc.), and thus have problems that they lack flexibility for use as packings or as supports for useful substances.

DISCLOSURE OF THE INVENTION

An object of the present invention is to provide a novel alkyl-containing porous resin free of the foregoing prior art drawbacks; a process for its preparation and its use.

Another object of the invention is to provide a novel porous body of alkyl-containing resin capable of fully exhibiting its modified functions based on the variations of chemical and structural environments on the surface of resin, the functions being modified by introducing alkyl groups having varying chain lengths; a process for preparation of the same and the use thereof.

Other objects and features of the invention will become apparent from the following description.

The present invention provides an alkyl-containing porous resin with a specific surface area of 50 to 600 m$^2$/g, the resin being prepared by polymerizing a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula

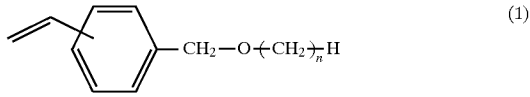

wherein n is an integer of 1 to 18.

The present invention also provides a process (I) for preparing the alkyl-containing porous resin, the process comprising the steps of mixing a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula (1) with an organic solvent which does not participate in polymerization, is sparingly soluble in water, is capable of solving the monomer mixture but is incapable of solving the resulting copolymer, and subjecting the resulting solution to a suspension polymerization in an aqueous medium in the presence of a radical polymerization initiator.

The present invention further provides a process (II) for preparing the alkyl-containing porous resin, the process comprising the steps of mixing together the above monomer mixture, a radical polymerization initiator and the above organic solvent to obtain an organic phase, dispersing under an elevated pressure the organic phase into an aqueous phase containing an anionic or nonionic surfactant through a porous glass membrane having a uniform pore diameter to disperse the organic phase, and carrying out a suspension polymerization.

The present invention also provides a packing material for liquid chromatography comprising the alkyl-containing porous resin.

The present inventor conducted extensive research to overcome the drawbacks of the prior art and found the following. When an alkyl-containing resin is prepared by subjecting a monomer mixture comprising a vinylbenzyloxyalkane derivative of the formula (1) as the third monomer component in addition to divinylbenzene and an aromatic monovinyl monomer such as styrene to suspension polymerization using a porogen and a radical polymerization initiator, alkyl groups with varied chain lengths can be introduced to the resin to modify the chemical or structural conditions of the resin surface. Because of the conditional variations, the resin can fully exhibit its functions.

The present inventor also found that the alkyl-containing porous resin can be preferably prepared by various suspension polymerization processes and can be suitably used as a packing material for liquid chromatography.

The present invention has been accomplished based on the above novel findings.

Described below in detail are the raw materials and polymerization procedure in the process (I) for preparing the alkyl-containing porous resin of the present invention.

The divinylbenzene to be used in the polymerization of the present invention may be any of commercially available products having a purity of about 50 to about 60%. These commercial products can be used as such or as purified by distillation. The commercial product contains about 50 to about 40% of ethylvinylbenzene as a main impurity. Of course, a high-purity commercial product, if available, can be used. The only requirement is that the monomer mixture prepared contain divinylbenzene in a proportion of 15 to 97% by weight based on the total weight of the monomers. Divinylbenzene usually contains meta- and para-isomers as main components. The divinylbenzene to be used in the present invention may be a mixture of these isomers or may contain one of them alone.

The styrene, methylstyrene and ethylvinylbenzene to be used as the aromatic monovinyl monomer in the present invention may be commercially available products. These commercial products can be used as such or as purified by distillation.

Methylstyrene usually contains meta-isomer, para-isomer, α-isomer and β-isomer. The methylstylene to be used in the invention may be a mixture of two or more of these isomers or may contain any one of them alone.

Ethylvinylbenzene includes meta-isomer and para-isomer. The ethylvinylbenzene used in the invention may be a mixture of these isomers or may be one of them alone. Since ethylvinylbenzene is contained in a certain proportion in commercial divinylbenzene, the commercial divinylbenzene is usually used as it is. However, ethylvinylbenzene, if available, may be further added, of course.

The vinylbenzyloxyalkane derivative of the formula (1) may be a mixture of meta-isomer and para-isomer or one of these isomers. In the formula (1), n is an integer of 1 to 18, preferably an integer of 1 to 12. When n is more than 18, the polymerization rate decreases or the specific surface area of the obtained resin reduces. Thus, the derivative of the formula (1) wherein n is more than 18 is not preferable.

The vinylbenzyloxyalkane derivative of the formula (1) can be synthesized by various processes without limiting the scope of the invention. For example, the vinylbenzyloxyalkane derivative can be obtained by treating an alkanol represented by the formula

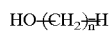 (2)

wherein n is an integer of 1 to 18 with sodium hydride to give alkoxide and reacting the alkoxide with vinylbenzyl halide such as vinylbenzyl chloride. Alternatively, the vinylbenzyloxyalkane derivative can be obtained by reacting alkyl halide with vinylbenzyl alcohol. The value of n is suitably selected to vary the chain length of the alkyl group of the resulting resin, giving variety to the chemical or structural environment of the resin surface. The vinylbenzyl halide used herein is usually available as a mixture of meta-isomer and para-isomer. In the present invention, such a mixture can be used as it is. Of course, meta-isomer and para-isomer may be individually used.

The mixing ratio of the monomers to be used in the invention is, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of the vinylbenzyloxyalkane derivative represented by the formula (1). A suitable mixing ratio can be selected from the proportional ranges according to the application of the porous resin to be produced. If the proportion of the divinylbenzene is less than 15% by weight, the specific surface area of the obtained resin reduces. Hence such a proportion is undesirable. If the proportion of the vinylbenzyloxyalkane derivative represented by the formula (1) is more than 50% by weight, the specific surface area of the obtained resin reduces. Hence such a proportion is undesirable. If the proportion of the vinylbenzyloxyalkane derivative is less than 3% by weight, the resultant resin with a significantly small number of alkyl groups fails to meet the requirements of the invention.

Preferably, the proportion of the monomers is, based on the total weight of the monomers, 15 to 85% by weight of divinylbenzene, 10 to 80% by weight of at least one aromatic monovinyl monomer selected from the group consisting of styrene, methylstyrene and ethylvinylbenzene, and 5 to 50% by weight of the vinylbenzyloxyalkane derivative of the formula (1). More preferably, the proportion lies in the range of 15 to 70% by weight of divinylbenzene, 25 to 80% by weight of the aromatic monovinyl monomer and 5 to 40% by weight of the vinylbenzyloxyalkane derivative.

The radical polymerization initiator is not limited insofar as it is soluble in the monomer mixture. Examples of the radical polymerization initiator include benzoyl peroxide, lauryl peroxide and like organic peroxides, azobis (isobutyronitrile) and like azo compounds. The amount of the polymerization initiator is selected from an optional range depending on the required properties of the porous resin to be produced and so on. Usually, it is used in a proportion of about 0.5 to about 5% by weight based on the total weight of the monomers.

The organic solvent to be mixed with the monomer mixture does not participate in polymerization, is sparingly soluble in water and dissolves the monomer mixture but does not dissolve the resulting copolymer. Such a solvent fully satisfies functional requirements as a porogen.

The organic solvent preferably has high affinity for the vinylbenzyloxyalkane derivative of the formula (1). Hydrocarbon solvents having 6 to 12 carbon atoms are particularly preferable. Examples of preferable solvents are hexane, heptane, octane, nonane, decane, undecane, dodecane and like aliphatic hydrocarbon solvents. The hydrocarbon moiety may be of straight- or branched-chain type. These organic solvents can be used either alone or in a mixture of two or more.

The mixing ratio of the organic solvent to the monomer mixture is selected from an optional range according to the required properties of the porous resin to be produced. Usually, the organic solvent/monomer mixture volume ratio ranges approximately from 70/30 to 15/85.

The suspension polymerization procedure in the present invention is hereafter explained in detail.

The suspension polymerization in the invention proceeds in a similar manner as in conventionally known processes. For example, a commonly employed suspension polymerization process is usable, which comprises suspending a clear solution comprising the foregoing monomers, radical polymerization initiator and organic solvent with stirring in an aqueous medium (such as water) optionally containing a suitable dispersion stabilizer, and polymerizing the suspension by heating. For suspension polymerization, the so-called micro-suspension process can be employed which comprises stirring the monomer solution at a high velocity using a homomixer or a homogenizer in an aqueous medium containing a suitable dispersion stabilizer to finely disperse the solution and polymerizing the dispersion by heating with stirring at an ordinary velocity. The micro-suspension polymerization provides secondary particles having a smaller diameter than the secondary particles obtainable by usual suspension polymerization processes.

Dispersion stabilizers useful in the suspension polymerization include, for example, polyvinyl alcohol, polyacrylamide, polyacrylic acid, gelatin and the like which are conventionally used. The amount of the dispersion stabilizer is not limited insofar as it can stably disperse, during the polymerization, the monomer solution into droplets having the required diameter of the resulting secondary particles.

The volume ratio of the monomer solution to the aqueous medium is not limited insofar as the suspension polymerization stably proceeds. A suitable ratio of the monomer solution/aqueous medium ratio ranges approximately from 1/10 to 1/2.

The polymerization temperature and the polymerization time are not limited, and the polymerization is effected under optimum conditions in consideration of the decomposition temperature and half-life of the polymerization initiator, the boiling point of the organic solvent, etc.

The resin obtained by the suspension polymerization can be purified by conventional purifying methods. For example, the resultant resin is filtered, washed with hot water to remove the dispersion stabilizer from the resin particles, further fully washed with acetone and/or methanol to remove the remaining unreacted monomer and the organic solvent and then heated under reduced pressure for drying, whereby the contemplated porous body of alkyl-containing resin is obtained.

Next, the process (II) for preparing the alkyl-containing porous resin of the invention is described in detail. According to the process (II), the alkyl-containing porous resin is obtained by mixing together the monomer mixture of divinylbenzene, an aromatic monovinyl monomer and the vinylbenzyloxyalkane derivative of the formula (1), a radical polymerization initiator and an organic solvent which can serve as the porogen to obtain a monomer solution (organic phase), and dispersing under elevated pressures the organic phase into an aqueous medium (aqueous phase) containing an anionic or nonionic surfactant and the optional dispersion stabilizer through a porous glass membrane having a uniform pore diameter, and carrying out a suspension polymerization.

The above process, which comprises the steps of dispersing the monomer solution using a porous glass membrane and polymerizing the resulting suspension, is highly advantageous in that an alkyl-containing porous resin consisting of secondary particles with a narrow particle size distribution can be easily obtained. Accordingly, the obtained alkyl-containing porous resin can be suitably used as a column-packing material, a support for useful substances, an absorber or the like, without further classification of the particles.

The monomer mixture, radical polymerization initiator, organic solvent and dispersion stabilizer, volume ratio of the monomer solution to the aqueous medium, etc. are similar to those in the process (I).

An anionic or nonionic surfactant is used when dispersing the organic phase comprising the monomer mixture, radical polymerization initiator and organic solvent in the aqueous phase through the porous glass membrane. The anionic surfactant includes sodium alkylsulfate, sodium alkylbenzenesulfonate, sodium alkylsulfosuccinate and the like, and the nonionic surfactant includes polyoxyethylene alkyl ether, polyethylene glycol fatty acid ester and the like. The amount of the surfactant is not limited insofar as it can stably disperse the organic phase in the aqueous phase in the form of droplets having the required diameter. Usually, the amount of surfactant is such that the concentration of the surfactant in the aqueous phase is preferably 0.05% by weight or more, more preferably 0.1 to 2% by weight.

After the dispersion of organic phase (after the formation of monomer solution droplets), suspension polymerization is carried out. The dispersion stabilizer may be used in combination with the surfactant to prevent the dispersed droplets from aggregating during the polymerization. The dispersion stabilizer is not required when the reaction proceeds steadily without aggregation of the droplets. When the dispersion stabilizer is used, it may be added to the aqueous phase during the dispersion procedure or may be added to the dispersion during the polymerization procedure. The amount of the dispersion stabilizer is not limited insofar as it can stably disperse the organic phase to form droplets having the required diameter. The amount of water for use as the aqueous phase is not limited insofar as the dispersion and polymerization can proceed smoothly.

The porous glass membrane to be used for dispersing the organic phase preferably has a uniform pore diameter within the range of about 0.1 to about 10 $\mu$m. In particular, glass membranes prepared from Shirasu porous glass have excellent uniformity in pore diameter and are preferable. When a glass membrane has an average pore diameter of about 0.1 to about 10 $\mu$m, the droplets obtained by dispersion usually have a particle diameter of about 3 to about 10 times the pore diameter of the glass membrane, and have a very narrow particle size distribution. When the porous glass membrane has an average pore diameter of less than 0.1 $\mu$m, the dispersion procedure requires a prolonged period. Thus, a glass membrane having an average pore diameter less than 0.1 $\mu$m is not preferable from the viewpoint of productivity. A glass membrane having an average pore diameter exceeding 10 $\mu$m is not preferable, since use thereof makes it very difficult to obtain droplets with a uniform diameter.

The pressure for forcing the organic phase into the aqueous phase through the glass membrane is not limited as long as the contemplated droplets can be obtained without deformation or disintegration. Droplets with a narrower particle size distribution can be efficiently obtained when the pressure is 1.05 to 1.5 times the critical pressure (the lowest pressure which can pass the organic phase through the pores of the glass membrane).

The temperature of the organic and aqueous phases during the dispersion is not limited insofar as the organic phase is stably dispersed without initiating polymerization. It is preferable to maintain the organic and aqueous phases at temperatures ranging from 0° to 60° C. during the dispersion. The period for dispersing the organic phase can be suitably determined without limitations.

As described above, the organic phase of the monomer solution is dispersed in the aqueous phase and subjected to suspension polymerization. The suspension polymerization can be carried out by any of the known processes as explained above. The polymerization temperature and polymerization time are not limited, and the polymerization can be carried out under optimum conditions in consideration of the decomposition temperature and half-life of the polymerization initiator, the boiling point of the organic solvent, etc.

The resin obtained by the suspension polymerization can be purified by a conventional process as in the process (I). The contemplated alkyl-containing porous resin is thus obtained which has a narrow particle size distribution.

The alkyl-containing porous resin of the invention has a high specific surface area of 50 to 600 $m^2/g$, and the secondary particles (apparent particles) of the resin are generally spherical in appearance and opaque.

Among the alkyl-containing porous resins of the invention, the porous resin prepared by the process (I) usually has a primary particle diameter of about 10 to about 100 nm in number average particle diameter (dn), a secondary particle diameter of about 1 to about 2000 $\mu$m (about 1 to about 30 $\mu$m when prepared by micro-suspension polymerization) in volume average particle diameter (dv), and an average pore radius of 30 to about 500 Å.

Among the alkyl-containing porous resins of the invention, the porous resin prepared by the process (II) usually has a primary particle diameter of about 10 to about 100 nm in number average particle diameter (dn), a secondary particle diameter of about 0.3 to about 100 $\mu$m in volume average particle diameter (dv), and an average pore radius of about 30 to about 500 Å. The second particles of the resin have a narrow particle size distribution (dv/dn) of usually about 1.05 to about 1.005.

The alkyl-containing porous resin of the invention is excellent in mechanical strength and chemical stability because the base resin is a divinylbenzene-styrene resin, and is very useful as it is as column packing, adsorber and support for various purposes, etc. In particular, the value of n in the vinylbenzyloxyalkane derivative of the formula (1) used as a monomer and the amount of the derivative can be suitably selected to control the chemical and structural properties of the resulting porous resin. The usefulness of the resin for a variety of applications is therefore increased.

Because of the above characteristics, the alkyl-containing porous resin particles of the invention are especially useful as a packing material for liquid chromatography. For use as the packing material, the resin particles are required to have a narrow size distribution from the viewpoint of theoretical plate number which indicates column performance. Since the porous resin obtained by the process (I) has a wide particle size distribution, it is usually used as the packing material for liquid cromatography after being classified to provide a desired diameter range. The particle diameter after classification is not limited, but the resin particles with a diameter range of about 3 to about 10 $\mu$m are very useful, for example, as a packing material for analytical liquid chromatography. The porous resin obtained by the process (II) has a narrow particle size distribution and thus is usable as the packing material for liquid chromatography without classification.

The packing for liquid chromatography of the invention can be employed for analysis in a wide pH range, because of its excellent chemical stabilities such as solvent resistance.

Further, the alkyl-containing porous resin of the invention, when used as packing material for liquid chromatography, can provide a larger theoretical plate number than the conventional divinylbenzene-styrene porous resin and makes it possible to easily achieve high-accuracy analysis.

BRIEF DESCRIPTION OF THE DRAWINGS

FIG. 1 is a schematic illustration of the membrane emulsification device used in the following Examples 7 to 15.

The numerals in the figure indicate the following. 1: organic phase, 2: aqueous phase, 3: organic phase tank, 4: aqueous phase tank, 5: organic phase line, 6: aqueous phase line, 7: double pipe module, 8: porous glass membrane, 9: nitrogen gas line, 10: pressure gauge, 11: circulation pump, 12: nitrogen gas bomb.

BEST MODE OF CARRYING OUT THE INVENTION

Examples and Comparative Examples are given below to clarify the present invention.
Examples of alkyl-containing porous resin prepared by process (I)

EXAMPLE 1

Ion exchange water (150 ml) was placed in a 300 ml separable flask equipped with a stirrer, thermometer, nitrogen-supplying line and condenser, and 3.0 g of polyvinyl alcohol ("Poval-217", product of KURARAY CO., LTD.) was added to obtain a solution. Added thereto was a monomer mixture solution consisting of 16.22 g of divinylbenzene (content (purity) 55%, the balance 45% being ethylvinylbenzene), 6.76 g of styrene, 4.06 g of vinylbenzyloxydodecane (a compound of the formula (1) wherein n is 12), 13.68 g of n-heptane and 0.541 g (2.0% based on the total weight of the monomers) of azobis(isobutyronitrile). The resulting mixture was stirred in a nitrogen stream at an agitation rate of about 400 to about 500 rpm for 10 minutes. The mixture obtained was heated to 75° to 80° C. and polymerized over a period of 6 hours while maintaining the temperature. After polymerization, the resultant product was cooled to room temperature. The resin was separated by filtration, well washed successively with hot water and acetone, and finally heated to 70° to 80° C. under reduced pressure (about 1 mm/Hg) for drying. Thus, 25.4 g (yield 94%) of an alkyl-containing porous resin was produced. The resin had an apparent particle diameter (average secondary particle diameter) of 190 $\mu$m in volume average particle diameter (dv) and 168 $\mu$m in number average particle diameter (dn), a particle size distribution (dv/dn) of 1.131, an average primary particle diameter of 44 nm in number average particle diameter, a specific surface area of 196 $m^2/g$, and an average pore radius of 57 Å.

EXAMPLES 2 AND 3

Resins were obtained by carrying out suspension polymerization in the similar manner as in Example 1 with the exception of altering the amounts of the monomers and the type and amount of the organic solvent as shown in Table 1.

EXAMPLE 4

Ion exchange water (160 ml) was placed in a 300 ml separable flask, and 0.40 g of polyvinyl alcohol ("Poval-210", product of KURARAY CO., LTD.) was added to obtain a solution. Added thereto was a monomer mixture solution consisting of 12.98 g of divinylbenzene (content (purity) 55%, the balance 45% being ethylvinylbenzene), 5.41 g of styrene, 3.24 g of vinylbenzyloxydodecane, 10.94 g of n-heptane and 0.433 g (2.0% by weight of the total weight of the monomers) of azobisisobutyronitrile. The obtained mixture was dispersed at an agitation rate of about 10,000 rpm for 5 minutes using a homogenizer (product of IKA Co., Ltd.). Then, replacing the homogenizer with a usual type stirrer and setting a thermometer, nitrogen-supplying line and condenser, the dispersion was heated to 75° to 80° C. with stirring in a nitrogen stream at an agitation rate of about 400 to about 500 rpm, heated and polymerized over a period of 6 hours while maintaining the temperature. After polymerization, the obtained product was cooled to room temperature. The obtained resin was separated by filtration, washed well succesively with hot water, methanol and acetone, and finally heated to 70° to 80° C. under reduced pressure (about 1 mm/Hg) for drying, producing 20.2 g (yield 93%) of an alkyl-containing porous resin. The resin had an apparent particle diameter (average secondary particle diameter) of 7.19 μm in dv and 6.51 μm in dn, a particle size distribution (dv/dn) of 1.104, an average primary particle diameter of 39 nm in number average particle diameter, a specific surface area of 201 m$^2$/g, and an average pore radius of 56 Å.

EXAMPLES 5 AND 6

Resins were obtained by carrying out micro-suspension polymerization in the same manner as in Example 4 with the exception of altering the amounts of the monomers and the type and amount of the organic solvent as shown in Table 1.

Table 1 shows the amounts of the monomers and organic solvent.

TABLE 1

Amount of monomer (The parenthesized values being percentage by weight based on the total weight of monomers)

|  | Divinyl-benzene | Ethylvinyl-benzene | Styrene | Vinylbenzyl-oxyalkane derivative |
|---|---|---|---|---|
| Ex. 1 | 8.92 g (33%) | 7.30 g (27%) | 6.76 g (25%) | Vinylbenzyl-oxydodecane 4.06 g (15%) |
| Ex. 2 | 8.87 g (33%) | 7.25 g (27%) | 4.03 g (15%) | Vinylbenzyl-oxydodecane 6.72 g (25%) |
| Ex. 3 | 8.87 g (33%) | 7.25 g (27%) | 4.03 g (15%) | Vinylbenzyl-oxyhexane 6.72 g (25%) |
| Ex. 4 | 7.14 g (33%) | 5.84 g (27%) | 5.41 g (25%) | Vinylbenzyl-oxydodecane 3.24 g (15%) |
| Ex. 5 | 7.14 g (33%) | 5.84 g (27%) | 5.41 g (25%) | Vinylbenzyl-oxydodecane 3.24 g (15%) |
| Ex. 6 | 7.09 g (33%) | 5.80 g (27%) | 3.22 g (1.5%) | Vinylbenzyl-oxyhexane 5.38 g (25%) |

TABLE 1-continued

|  | Amount of organic solvent used | | Monomer/organic solvent | Method of |
|---|---|---|---|---|
|  | n-Heptane | n-Octane | (volume ratio) | polymerization |
| Ex. 1 | 13.68 g | None | 60/40 | Suspension |
| Ex. 2 | 13.68 g | None | 60/40 | Suspension |
| Ex. 3 | 13.68 g | None | 60/40 | Suspension |
| Ex. 4 | 10.94 g | None | 60/40 | Micro-suspension |
| Ex. 5 | None | 11.25 g | 60/40 | Micro-suspension |
| Ex. 6 | 10.94 g | None | 60/40 | Micro-suspension |

Property values of the porous resins prepared in Examples 1 to 6 were measured by the following methods.

Average secondary particle diameter (μm): The diameters of 500 or more arbitrary secondary particles were measured from an electron micrograph taken with a scanning electron microscope (product of Hitachi Ltd., "S-2000") to calculate the volume average particle diameter (dv) and number average particle diameter (dn). Then, the particle size distribution (dv/dn) was calculated.

Average primary particle diameter (nm): The diameters of 500 or more arbitrary primary particles were measured from an electron micrograph taken with a scanning electron microscope (product of Hitachi Ltd., "S-2000") to calculate the number average particle diameter.

Specific surface area (m$^2$/g) and average pore radius (Å): These values were measured using a BET surface area measuring device (product of Quantachrome Co., Ltd., "NOVA 1200").

Table 2 shows the measured property values of the porous resins prepared in Examples 1 to 6.

TABLE 2

|  | Appearance of apparent particle (secondary particle) | Average secondary particle diameter (μm) dv | dn | Particle size distribution dv/dn | Average primary particle size (nm) | Specific surface area (m²/g) | Average pore radius (Å) | Yield (%) |
|---|---|---|---|---|---|---|---|---|
| Ex.1 | Spherical, opaque | 190 | 168 | 1.131 | 44 | 196 | 57 | 94 |
| Ex.2 | Spherical, opaque | 220 | 191 | 1.152 | 46 | 198 | 51 | 93 |
| Ex.3 | Spherical, opaque | 215 | 188 | 1.144 | 45 | 204 | 65 | 95 |
| Ex.4 | Spherical, opaque | 7.19 | 6.51 | 1.104 | 39 | 201 | 56 | 93 |
| Ex.5 | Spherical, opaque | 6.48 | 5.82 | 1.113 | 41 | 184 | 52 | 92 |
| Ex.6 | Spherical, opaque | 6.82 | 6.15 | 1.109 | 42 | 213 | 50 | 94 |

Examples of alkyl-containing porous resin prepared by process (II)

EXAMPLE 7

An organic phase was prepared by clearly mixing 51.10 g of divinylbenzene (content(purity) 55%, the balance 45% being ethylvinylbenzene), 21.29 g of styrene, 12.78 g of vinylbenzyloxyhexane (a compound of the formula (1) wherein n is 6), 42.68 g of n-heptane and 1.703 g (2.0% by weight of the total weight of the monomers) of azobisisobutyronitrile. An aqueous phase was prepared by dissolving in 630 ml of ion exchange water 12.6 g of polyvinyl alcohol ("Poval-224", product of KURARAY CO., LTD.) and 1.26 g of sodium dodecylsulfate.

The above organic phase 1 and aqueous phase 2 were respectively placed in an organic phase tank 3 and an aqueous phase tank 4 of the membrane emulsification device (product of Ise Chemicals Co.) as shown in FIG. 1. The aqueous phase was circulated through an aqueous phase line 6 using a circulation pump 11, and the organic phase was forced from an organic phase line 5 into the aqueous phase, at a pressure of 0.64 kgf/cm² (gauge 10) using the nitrogen gas line 9 from a bomb 12, through a porous glass membrane 8 (average pore diameter 0.70 μm) in a double pipe module 7, giving a dispersion. The dispersion procedure was completed when 120 ml (99.7 g) of organic phase had been dispersed over a period of 2.5 hours. The organic and aqueous phases were maintained at 25° to 30° C. during the procedure.

Then, 742 g of the above obtained dispersion was placed in a 1000 ml separable flask. After setting a stirrer, thermometer, nitrogen-supplying line and condenser, the dispersion was heated to 75° to 80° C. in a nitrogen stream with stirring at an agitation velosity of about 400 to about 500 rpm. While maintaining the temperature, the dispersion was polymerized over a period of 6 hours. After polymerization, the product was cooled to room temperature. The obtained resin was separated by filtration, washed well succesively with hot water, methanol and acetone and heated to 70° to 80° C. under reduced pressure (about 1 mm/Hg) for drying, giving 55.7 g (yield 85%) of alkyl-containing porous resin. The resin had an apparent particle diameter (average secondary particle diameter) of 5.06 μm in dv and 4.98 μm in dn, a particle size distribution (dv/dn) of 1.016, an average primary particle diameter of 41 nm in number average particle diameter, a specific surface area of 228 m²/g, and an average pore radius of 62 Å. It is apparent from the dv/dn value that the secondary particles of the resin had a narrow particle size distribution.

EXAMPLES 8 TO 15

Alkyl-containing porous resins were prepared by carrying out polymerization in the same manner as in Example 7 with the exception of altering the types and amounts of the monomers, the amount of organic solvent and conditions for dispersing the organic phase as shown in Table 3.

Table 3 shows the amounts of the monomers and organic solvent and conditions for dispersing the organic phase.

TABLE 3

| | Amount of monomer (The parenthesized values being percentage by weight based on the total weight of monomers) | | | |
|---|---|---|---|---|
| | Divinyl-benzene | Ethylvinyl-benzene | Styrene | Vinylbenzyloxyalkane derivative |
| Ex. 7 | 28.11 g (33%) | 22.99 g (27%) | 21.29 g (25%) | Vinylbenzyloxyhexane 12.78 g (15%) |
| Ex. 8 | 30.45 g (33%) | 24.91 g (27%) | 23.07 g (25%) | Vinylbenzyloxyhexane 13.84 g (15%) |
| Ex. 9 | 30.46 g (36%) | 24.92 g (29%) | 17.04 g (20%) | Vinylbenzyloxyhexane 12.78 g (15%) |
| Ex. 10 | 28.03 g (33%) | 22.93 g (27%) | 21.23 g (25%) | Vinylbenzyloxydodecane 12.74 g (15%) |

TABLE 3-continued

| | | | | |
|---|---|---|---|---|
| Ex. 11 | 30.36 g (33%) | 24.84 g (27%) | 23.00 g (25%) | Vinylbenzyloxydodecane 13.80 g (15%) |
| Ex. 12 | 30.45 g (33%) | 24.91 g (27%) | 23.07 g (25%) | Vinylbenzyloxyhexane 13.84 g (15%) |
| Ex. 13 | 30.45 g (33%) | 24.91 g (27%) | 23.07 g (25%) | Vinylbenzyloxyhexane 13.84 g (15%) |
| Ex. 14 | 30.45 g (33%) | 24.91 g (27%) | 23.07 g (25%) | Vinylbenzyloxyhexane 13.84 g (15%) |
| Ex. 15 | 30.45 g (33%) | 24.91 g (27%) | 23.07 g (25%) | Vinylbenzyloxyhexane 13.84 g (15%) |

| | Amount of organic solvent (n-heptane) | Monomer/ organic solvent (volume ratio) | Poly- merization method | Average pore diameter of porous glass membrane ($\mu$m) | Pressure for dispersion (kgf/cm$^2$) | Priod for dispersing monomer solution (min) |
|---|---|---|---|---|---|---|
| Ex.7  | 42.68 g | 60/40 | Suspension polymerization of dispersion obtained using porous glass membrane | 0.70 | 0.64 | 150 |
| Ex.8  | 37.35 g | 65/35 | | 0.70 | 0.63 | 155 |
| Ex.9  | 42.68 g | 60/40 | | 0.70 | 0.63 | 160 |
| Ex.10 | 42.68 g | 60/40 | | 0.70 | 0.64 | 160 |
| Ex.11 | 37.35 g | 65/35 | | 0.70 | 0.64 | 160 |
| Ex.12 | 37.35 g | 65/35 | | 0.51 | 0.94 | 240 |
| Ex.13 | 37.35 g | 65/35 | | 0.60 | 0.81 | 220 |
| Ex.14 | 37.35 g | 65/35 | | 0.82 | 0.61 | 140 |
| Ex.15 | 37.35 g | 65/35 | | 1.00 | 0.48 | 110 |

Property values of the alkyl-containing porous resins prepared in Examples 7 to 15 were measured by the methods described above.

Table 4 shows the measured property values of the alkyl-containing porous resins of Examples 7 to 15.

TABLE 4

| | Appearance of apparent particle (secondary particle) | Average secondary particle diameter ($\mu$m) | | Particle size distribu- tion | Average primary particle size | Specific surface area | Average pore radius | Yield |
|---|---|---|---|---|---|---|---|---|
| | | dv | dn | dv/dn | (nm) | (m$^2$/g) | (Å) | (%) |
| Ex.7  | Spherical, opaque | 5.06 | 4.98 | 1.016 | 41 | 228 | 62 | 85 |
| Ex.8  | Spherical, opaque | 5.04 | 4.96 | 1.016 | 42 | 191 | 48 | 87 |
| Ex.9  | Spherical, opaque | 5.21 | 5.11 | 1.020 | 35 | 326 | 55 | 83 |
| Ex.10 | Spherical, opaque | 4.98 | 4.89 | 1.018 | 45 | 166 | 60 | 84 |
| Ex.11 | Spherical, opaque | 4.85 | 4.77 | 1.017 | 45 | 151 | 51 | 86 |
| Ex.12 | Spherical, opaque | 3.51 | 3.45 | 1.017 | 41 | 210 | 51 | 85 |
| Ex.13 | Spherical, opaque | 4.15 | 4.09 | 1.015 | 41 | 203 | 49 | 84 |
| Ex.14 | Spherical, opaque | 5.65 | 5.52 | 1.023 | 42 | 192 | 48 | 83 |
| Ex.15 | Spherical, opaque | 8.82 | 8.60 | 1.026 | 42 | 189 | 51 | 84 |

Examples and Comparative Examples of packings for liquid chromatography

EXAMPLE 16

(i) Preparation of packing

Ion exchange water (640 ml) was placed in a 1000 ml separable flask, and 2.24 g of polyvinyl alcohol ("Poval-210", product of KURARAY CO., LTD.) was added to obtain a solution. Added thereto was a monomer mixture solution consisting of 56.78 g of divinylbenzene (content (purity) 55%, the balance 45% being ethylvinylbenzene), 23.66 g of styrene, 14.19 g of vinylbenzyloxyhexane, 38.30 g of n-heptane and 1.893 g (2.0% by weight of the total weight of the monomers) of azobisisobutyronitrile. The obtained mixture was dispersed at an agitation velocity of about 13,000 rpm for 10 minutes using a homogenizer (product of IKA Co., Ltd.) Then, replacing the homogenizer with a usual type stirrer and setting a thermometer, nitrogen-supplying line and condenser, the dispersion was heated to 75° to 80° C. in a nitrogen stream with stirring at an agitation velocity of about 400 to about 500 rpm and polymerized over a period of 6 hours while maintaining the temperature. After polymerization, the product was cooled to room temperature. The obtained resin was separated by filtration, washed well successively with hot water, methanol and acetone, and finally heated to 70° to 80° C. under reduced pressure (about 1 mm/Hg) for drying, producing 88.0 g (yield 93%) of an alkyl-containing porous resin. The resin had an apparent particle diameter (average secondary particle diameter) of 3.87 μm in dv and 3.48 μm in dn, a particle size distribution (dv/dn) of 1.112, an average primary particle diameter of 42 nm in number average particle diameter, a specific surface area of 162 m$^2$/g, and an average pore radius of 46 Å.

Subsequently, the resin was classified using an air classification machine ("MDS-II", product of Nippon Pneumatic MFG. Co.). The classified resin had an apparent particle diameter (average secondary particle diameter) of 4.69 μm in dv and 4.51 μm in dn, a particle size distribution (dv/dn) of 1.040, an average primary particle diameter of 41 nm in number average particle diameter, a specific surface area of 159 m$^2$/g and an average pore radius of 47 Å. The resin was used as a packing.

(ii) Column packing

The above obtained packing was packed into a stainless steel column with an inner diameter of 4.6 mm and a length of 150 mm using "Packing solvent R-5" (product of GL sciences Inc., Ltd.) and isopropyl alcohol at a low packing pressure of 80 to 150 kg/cm$^2$, giving a column for liquid chromatography.

EXAMPLES 17 TO 21 AND COMPARATIVE EXAMPLES 1 AND 2

(i) Preparation of packing

Alkyl-containing porous resins were obtained by carrying out polymerization in the same manner as in Example 16 with the exception of altering the types and amounts of the monomers and the amount of the organic solvent as shown in Table 5. The resins were classified to obtain packings.

Table 5 shows the amounts of the monomers and organic solvent, Table 6 the property values of the unclassified resins, and Table 7 the property values of the classified resins (packings).

TABLE 5

Amount of monomer(The parenthesized values being percentage by weight based on the total weight of monomers)

|  | Divinyl-benzene | Ethylvinyl-benzene | Styrene | Vinylbenzyl-oxyalkane derivative |
|---|---|---|---|---|
| Ex. 16 | 31.23 g (33%) | 25.55 g (27%) | 23.66 g (25%) | Vinylbenzyl-oxyhexane 14.19 g (15%) |
| Ex. 17 | 31.24 g (36%) | 25.56 g (29%) | 17.48 g (20%) | Vinylbenzyl-oxyhexane 13.11 g (15%) |
| Ex. 18 | 31.23 g (33%) | 25.56 g (27%) | 14.20 g (15%) | Vinylbenzyl-oxyhexane 23.66 g (25%) |
| Ex. 19 | 31.24 g (36%) | 25.56 g (29%) | 8.74 g (10%) | Vinylbenzyl-oxyhexane 21.85 g (25%) |
| Ex. 20 | 31.15 g (36%) | 25.49 g (29%) | 17.43 g (20%) | Vinylbenzyl-oxydodecane 13.07 g (15%) |
| Ex. 21 | 31.10 g (36%) | 25.44 g (29%) | 8.70 g (10%) | Vinylbenzyl-oxydodecane 21.75 g (25%) |
| Comp. Ex.1 | 28.82 g (33%) | 23.58% (27%) | 34.93% (40%) | None |
| Comp. Ex.2 | 31.22 g (33%) | 25.54% (27%) | 37.84% (40%) | None |

|  | Amount of solvent (n-heptane) | Monomer/organic solvent (volume ratio) | Polymerization method |
|---|---|---|---|
| Ex. 16 | 38.30 g | 65/35 | Micro-suspension polymerization |
| Ex. 17 | 43.78 g | 60/40 |  |
| Ex. 18 | 38.30 g | 65/35 |  |
| Ex. 19 | 43.78 g | 60/40 |  |
| Ex. 20 | 43.78 g | 60/40 |  |
| Ex. 21 | 43.78 g | 60/40 |  |
| Comp. Ex. 1 | 43.78 g | 60/40 |  |
| Comp. Ex.2 | 38.30 g | 65/35 |  |

TABLE 6

| | Appearance of apparent particle (secondary particle) | Average secondary particle diameter (μm) | | Particle size distribution dv/dn | Average primary particle size (nm) | Specific surface area (m²/g) | Average pore radius (Å) | Yield (%) |
|---|---|---|---|---|---|---|---|---|
| | | dv | dn | | | | | |
| Ex.16 | Spherical, opaque | 3.87 | 3.48 | 1.112 | 42 | 162 | 46 | 93 |
| Ex.17 | Spherical, opaque | 4.11 | 3.65 | 1.126 | 43 | 237 | 54 | 91 |
| Ex.18 | Spherical, opaque | 4.35 | 3.91 | 1.113 | 46 | 110 | 43 | 93 |
| Ex.19 | Spherical, opaque | 3.93 | 3.52 | 1.116 | 45 | 199 | 48 | 89 |
| Ex.20 | Spherical, opaque | 4.05 | 3.62 | 1.119 | 41 | 232 | 56 | 91 |
| Ex.21 | Spherical, opaque | 4.09 | 3.64 | 1.124 | 45 | 133 | 48 | 92 |
| Comp. Ex.1 | Spherical, opaque | 3.83 | 3.42 | 1.120 | 40 | 246 | 62 | 92 |
| Comp. Ex.2 | Spherical, opaque | 3.80 | 3.38 | 1.124 | 41 | 226 | 41 | 93 |

TABLE 7

| | Appearance of apparent particle (secondary particle) | Average secondary particle diameter (μm) | | Particle size distribution dv/dn | Average primary particle size (nm) | Specific surface area (m²/g) | Average pore radius (Å) |
|---|---|---|---|---|---|---|---|
| | | dv | dn | | | | |
| Ex.16 | Spherical, opaque | 4.69 | 4.51 | 1.040 | 41 | 159 | 47 |
| Ex.17 | Spherical, opaque | 5.23 | 4.98 | 1.051 | 43 | 241 | 56 |
| Ex.18 | Spherical, opaque | 5.60 | 5.41 | 1.035 | 45 | 112 | 43 |
| Ex.19 | Spherical, opaque | 4.91 | 4.69 | 1.047 | 45 | 201 | 50 |
| Ex.20 | Spherical, opaque | 5.13 | 4.88 | 1.052 | 41 | 233 | 56 |
| Ex.21 | Spherical, opaque | 5.16 | 4.92 | 1.049 | 46 | 132 | 48 |
| Comp. Ex.1 | Spherical, opaque | 4.72 | 4.51 | 1.046 | 40 | 246 | 64 |
| Comp. Ex.2 | Spherical, opaque | 4.54 | 4.35 | 1.044 | 41 | 226 | 42 | ii) Column packing

Columns for liquid chromatography were prepared by packing the above obtained packings into columns in the same manner as in Example 16.

Subsequently, the columns for liquid chromatography obtained in Examples 16 to 21 and Comparative Example 1 and 2 were checked for performance by the following methods. Each column was connected to a high-performance liquid chromatography system ("HPLC 610 Isocratic", product of Nippon Waters KK). Then, test compounds (pyridine, 2-ethylpyridine, N,N-dimethylaniline, phenol, methyl salicylate, 3-pentanone and 3-hexanone) were analyzed under the following conditions. Eluent: acetonitrile/water (50/50), flow rate: 1.0 ml/min, temperature: 25° C., and detection UV: 254 nm. The column performance was evaluated in terms of theoretical plate number [5.54×(retention time/half width)$^2$] and retention time (min).

Table 8 shows the results.

TABLE 8

| | Test compound | | | | | | |
|---|---|---|---|---|---|---|---|
| | Pyridine | 2-Ethyl-pryidine | N,N-Dimethyl-aniline | Phenol | Methyl salicylate | 3-Pentanone | 3-Hexanone |
| Ex.16 | 2720 (5.39) | 3850 (8.00) | 10100 (41.9) | 4220 (7.64) | 9400 (29.5) | 5410 (8.89) | 6780 (12.6) |
| Ex.17 | 2700 (5.61) | 3840 (7.98) | 8760 (38.0) | 3960 (7.68) | 8300 (27.0) | 5020 (8.76) | 6250 (12.1) |
| Ex.18 | 2610 (5.28) | 3750 (7.84) | 10300 (38.9) | 4250 (7.85) | 9000 (28.8) | 4930 (8.77) | 6440 (13.0) |
| Ex.19 | 2730 (5.48) | 3750 (7.90) | 8770 (36.9) | 4300 (7.96) | 8510 (27.0) | 5280 (8.71) | 6890 (12.3) |
| Ex.20 | 2980 (5.53) | 3970 (7.98) | 8670 (38.3) | 4490 (7.63) | 8800 (27.3) | 5630 (8.77) | 7370 (12.2) |
| Ex.21 | 2830 (5.50) | 4010 (8.11) | 9430 (38.5) | 4460 (7.96) | 9430 (28.1) | 5560 (9.04) | 7280 (12.8) |

TABLE 8-continued

| | | | Test compound | | | | |
|---|---|---|---|---|---|---|---|
| | Pyridine | 2-Ethyl-pryidine | N,N-Dimethyl-aniline | Phenol | Methyl salicylate | 3-Pentanone | 3-Hexanone |
| Comp. Ex.1 | 1990 (5.57) | 2780 (7.73) | 6190 (37.8) | 2550 (6.97) | 5770 (26.3) | 3390 (8.28) | 3850 (11.2) |
| Comp. Ex.2 | 1320 (5.48) | 1880 (8.02) | 4000 (48.9) | 1700 (7.18) | 3750 (30.1) | 2020 (8.71) | 2450 (12.3) |

In the table, the upper values indicate theoretical plate numbers and the lower parenthesized values retention times.

EXAMPLES 22 TO 25

Columns for liquid chromatography were obtained in the same manner as in Example 16, using tht porous resins obtained in Examples 7, 8, 9 and 11 as packings. The obtained columns were checked for performance in the same manner as above.

Table 9 shows the results.

TABLE 9

| | | | | Test compound | | | | |
|---|---|---|---|---|---|---|---|---|
| | Packing | Pyridine | 2-Ethyl-pyridine | N,N-Dimethyl-aniline | Phenol | Methyl salicylate | 3-Pentan-one | 3-Hexan-one |
| Ex.22 | Resin of Ex.7 | 2820 (5.56) | 4040 (7.79) | 7740 (36.8) | 4330 (7.60) | 7790 (26.5) | 5380 (8.54) | 6970 (11.8) |
| Ex.23 | Resin of Ex.8 | 2800 (5.46) | 4150 (8.01) | 11200 (41.6) | 4540 (7.82) | 11100 (29.7) | 5570 (8.94) | 7560 (12.7) |
| Ex.24 | Resin of Ex.9 | 2670 (5.54) | 3890 (7.87) | 7440 (38.5) | 3910 (7.66) | 7632 (27.2) | 4810 (8.65) | 6100 (12.0) |
| Ex.25 | Resin of Ex.11 | 2660 (5.39) | 4240 (8.01) | 6820 (42.0) | 4350 (7.70) | 7390 (30.1) | 5470 (9.00) | 7160 (12.9) |

In the table, the upper values indicate theoretical plate numbers and the lower parenthesized values retention times.

I claim:

1. An alkyl-containing porous resin with a specific surface area of 50 to 600 m$^2$/g, the resin being prepared by polymerizing a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula

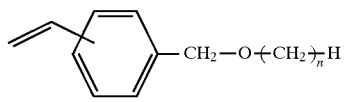

(1)

wherein n is an integer of 1 to 18.

2. A process for preparing an alkyl-containing porous resin with a specific surface area of 50 to 600 m$^2$/g, the process comprising the steps of mixing a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula

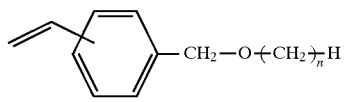

(1)

wherein n is an integer of 1 to 18, with an organic solvent which does not participate in polymerization, is sparingly soluble in water, is capable of solving the monomer mixture but is incapable of solving the resulting copolymer, and subjecting the obtained solution to suspension polymerization in an aqueous medium using a radical polymerization initiator.

3. A process according to claim 2 wherein the organic solvent is at least one $C_{6-12}$ hydrocarbon solvent which is used singly or as a mixture of two or more.

4. A process for preparing an alkyl-containing porous resin with a specific surface area of 50 to 600 m$^2$/g, the process comprising the steps of mixing together a monomer mixture of, based on the total weight of the monomers, 15 to 97% by weight of divinylbenzene, 0 to 82% by weight of at least one aromatic monovinyl monomer selected from the group consisting of styrene, methylstyrene and ethylvinylbenzene and 3 to 50% by weight of a vinylbenzyloxyalkane derivative represented by the formula

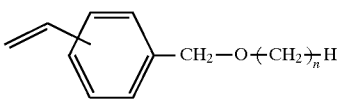

(1)

wherein n is an integer of 1 to 18, a radical polymerization initiator, an organic solvent which does not participate in polymerization, is sparingly soluble in water, is capable of solving the monomer mixture but is incapable of solving the resulting copolymer, dispersing under an elevated pressure the obtained organic phase into an aqueous phase containing an anionic or nonionic surfactant through a porous glass membrane having a uniform pore diameter to disperse the organic phase, and subjecting the dispersion to suspension polymerization.

5. A process according to claim 4 wherein the organic solvent is at least one $C_{6-12}$ hydrocarbon solvent which is used singly or as a mixture of two or more.

6. A process according to claim 4 wherein the porous glass membrane has an average pore diameter of 0.1 to 10 μm.

7. A process according to claim 4 wherein the porous glass membrane comprises a Shirasu porous glass.

8. A packing for liquid chromatography comprising the alkyl-containing porous resin according to claim 1.

* * * * *